United States Patent [19]
Sprules

[11] Patent Number: 5,910,454
[45] Date of Patent: Jun. 8, 1999

[54] COFFEE-BASED SOLID FUEL COMPOSITION

[76] Inventor: Rodney K. Sprules, 88 Greynam Court, Nepean, Ontario, Canada, K2G 5T3

[21] Appl. No.: 09/086,797

[22] Filed: May 29, 1998

[51] Int. Cl.$^6$ .................... C10L 5/40; C10L 5/48
[52] U.S. Cl. .................... 44/535; 44/576; 44/589
[58] Field of Search ................. 44/535, 576, 589

[56] References Cited

U.S. PATENT DOCUMENTS

| | | | |
|---|---|---|---|
| 4,043,765 | 8/1977 | Tanner | 44/14 |
| 4,272,322 | 6/1981 | Kobayashi | 44/589 |
| 4,326,854 | 4/1982 | Tanner | 44/10 B |
| 4,548,615 | 10/1985 | Lonchamp et al. | 44/605 |
| 4,769,044 | 9/1988 | Cornwell | 44/605 |
| 4,863,488 | 9/1989 | Maeda et al. | 44/589 |
| 5,393,310 | 2/1995 | Wollen | 44/535 |

OTHER PUBLICATIONS

The Combustion of Solid Fuels and Wastes, David A. Tillman, Academic Press, Inc., San Diego, CA, 1991, pp. 1–63.

*Primary Examiner*—Jerry D. Johnson
*Attorney, Agent, or Firm*—Neil Teitelbaum & Associates

[57] ABSTRACT

The present invention relates to a solid burnable fuel composition which contains a major proportion of spent dried coffee grounds for forming into high density pellets, synthetic fire-logs and fire kindling products. A homogeneous mixture of at least 50% coffee, with 30% or less by weight of a combustible binder is compressed and extruded in the form of fire-logs. A pellet fuel comprising entirely coffee provides a higher energy fuel source than prior art fuel sources. Coffee has a higher calorific value than hardwood, providing an efficient fuel material requiring less combustible binder, such as wax, than prior art fire-logs, and offering a higher energy value pellet than wood without added binder.

11 Claims, No Drawings

COFFEE-BASED SOLID FUEL COMPOSITION

FIELD OF THE INVENTION

The present invention relates to a solid burnable fuel composition, which contains a major proportion of used coffee grounds, particularly in the form of high-density pellets, synthetic fire-logs, and fire kindling products.

BACKGROUND OF THE INVENTION

Manufactured fuel logs and pellets for fireplaces and stoves are well known as an alternative heat source and for aesthetic enjoyment. Such fuels are selected for convenience, efficiency and cost advantages. The higher burn rate, longer burn time, and higher energy density make processed solid fuel a more convenient alternative over natural wood. Furthermore, wood has more valuable uses, and is accordingly more costly. The desire to reduce wood consumption to a sustainable rate, and to reduce the significant deforestation currently occurring, adds additional motivation to find an alternative fuel source. Finally, decreasing landfill capacities have generated searches for alternative uses of waste byproducts.

In a study by David A. Tillman, *The Combustion of Solid Fuels and Wastes* published in 1991, the combustion of solid fuels and wastes (including coffee waste) is suggested as potentially economical in raising process energy, generating electricity, and reducing the volume of municipal waste in landfills. The combustion of solid fuel particles—such as biomass, fossil fuels and municipal refuse—in an industrial furnace, boiler or kiln at high rates is investigated. The many advantages of coffee as a fuel source are not apparent in these teachings. Furthermore, no proposal is made for the production of processed solid fuels or domestically combustible fuels.

Prior art manufactured logs and pellets for domestic use have not been entirely satisfactory either in burn characteristics or in costs. A discussion of prior art illuminates the advantages offered by the present invention. The main advantages of processed fire-logs generally include long burn time, easy lighting characteristics, and convenience of use for preparation or maintenance of the fire. As a replacement for natural wood fires, processed logs offer the convenience of not having to stoke the fire to ensure a consistent flame. One log typically burns between 3 to 4 hours, depending on the size of log.

However, these advantages are not unqualified. In order to achieve both a substantial flame and a quick ignition time, a significant amount of wax is used. The high combustion rate, in combination with limited air supply, typically results in incomplete combustion, which in turn leads to a buildup of soot and creosote in the flue. This incomplete combustion is further intensified by the low infiltration rates common in new home construction. Repeated use of such prior art fuel logs, represents a fire hazard. Indeed, due to the seriousness of this problem, insurance companies recommend that consumers alternate between the use of artificial fire-logs and natural wood fires, in addition to frequent cleaning of combustion apparatus.

Not only does the excessive use of wax represent a safety hazard due to the build-up of soot, but it means that the consumer is provided with an aesthetically less pleasing product than natural wood fires. While the substantial use of wax promotes faster ignition, the flame height for the later stages of combustion is significantly lower than in the beginning. Hence, it is difficult for the user to enjoy a flame comparable to a well-maintained natural wood fire. It is desired to provide a solid fuel which incorporates less wax, yet still retains high energy burn characteristics.

In order to improve ignition time, without affecting the combustion properties of the entire log, an "ignition strip" is disclosed in U.S. Pat. No. 4,043,765 issued to Tanner in 1977. Given the high combustion rates associated with a high wax content, this would be a preferable approach to improving ignition time. However, a high proportion of wax throughout the product is still required to maintain a high burn rate following ignition.

A synthetic log is disclosed in U.S. Pat. No. 5,393,310 issued to Wollen in 1995, which incorporates a large proportion of waste products, namely grass clippings and leaves. It is an object of this prior invention to use the composition to reduce yard waste in the waste stream while providing a burnable fuel. Leaves and grass clippings, however, do not provide a satisfactory fuel source, and even with the addition of significant amounts of paraffin wax, such logs have a low calorific value. It is suggested that the grass clippings be incorporated directly from the lawn without further processing. This also means that a higher moisture content will be present to hinder burning.

In response to pressures on the supply of petroleum waxes, and hence the increasing cost, U.S. Pat. No. 4,326,854 issued in 1982 to Tanner discloses the use of a liquid combustible by-product with cellulosic and ligno-cellulosic materials in a synthetic fire log. In this disclosure a skeleton of solid burnable material such as sawdust or other material such as peanut shell fines, cocoa bean shell fines, coconut shell or walnut shell fines, bagasse or paper pulp, is incorporated at between 25% and 70% by weight with a binder comprising a liquid combustible byproduct, which is solidified by either polymerization or neutralization with the addition of various chemicals. The preferred liquid binder is molasses. As one of many examples, Tanner tested a composition containing 60 parts (by weight) vegetable pitch, 6 parts oleic acid, 3 parts caustic soda, and 37 parts coffee grounds. As the major portion of the composition is liquid combustible byproduct, advantages from burning coffee of cleaner burn and higher energy yield are not observable from Tanners results.

Pellet fuels contain fewer additives than manufactured logs, commonly being formed of wood and other ligno-cellulosic material, such as bark compressed under high pressure. Pellet fuel is attractive for burning in stoves for heating purposes, since a large quantity can be charged in a hopper for continuous release as needed. The uniform size of the pellets and the controlled feed rate results in more efficient combustion than larger solid fuels. Because a pellet stove may be self-feeding, and hence burning for many hours continuously, a clean burning fuel which produces less ash is desired. However, as a heat source, a fuel with a higher energy density is also desired.

Pellets are burned over a grate through which remaining ash is removed. It is important that the pellets retain their shape during handling and combustion without crumbling, which would add fines to the feed stream. Fines of unburned fuel can drop through the grate where they may be ignited by hot ash. This is not only a waste of fuel, but also a safety problem. Wood-based biomass and sawdust is very irregular in size, due to the process in which it is created. Therefore, it must be ground to the correct consistency prior to being pelletized, adding a significant amount of processing costs.

Coffee, in the form of spent grounds, is a very attractive fuel source for manufactured logs and pellets. Coffee contains approximately 25% higher energy potential than dry hardwood. Used coffee also has a highly uniform particle size. Currently no further use is available for spent coffee. Thus the use of coffee as a fuel source is energy efficient, inexpensive and diverts waste from landfill. By utilizing the desirable characteristics inherent to coffee grounds, a premium solid fuel can be produced according to the present invention without large quantities of added wax. This fuel offers efficiency, cost, environmental, safety and aesthetic advantages over existing processed solid fuels.

SUMMARY OF THE INVENTION

It is an object of the present invention to provide a processed solid fuel source comprising primarily of spent coffee grounds. Coffee grounds, either prior to or after brewing, are a substantial source of renewable energy. Post-brewed coffee grounds have a superior higher heating value (HHV) than that of dry hardwood. This energy source is not only considered waste, but is occupying valuable landfill space.

Accordingly, the present invention comprises a processed solid burnable fuel composition comprising at least 50% spent coffee grounds.

A further preferred embodiment of the present invention comprises a processed solid burnable fuel composition comprising at least 70% dried spent coffee grounds.

In a still further preferred embodiment the present invention provides a processed burnable fuel log comprising an extruded homogeneous mixture including: 75% coffee grounds having a particle size less than 2 mm and a moisture content of less than 20%; and up to 25% of a solid combustible binder, whereby the log has a density of between 800 and 850 kg/m$^3$.

As indicated in Table 1, coffee has an energy content in excess of 10,000 BTU/lb. Existing logs are currently produced from a combination of solid particulate and a combustible binder compressed together with pressure and heat. The most common solids used are wood and bark shavings that have HHV's ranging from 8000 to 9500 BTU/lb. The implication is that when coffee grounds are used as the main constituent, less combustible binder is required to achieve the equivalent calorific value of prior art.

TABLE 1

Characteristics of Spent (Post-Brewed) Coffee Grounds

| Analytical Data/Test Method | Units | As Analyzed | Dry @ 105° C. |
|---|---|---|---|
| Heat of Combustion, ISO-1928 | BTU/lb | 10 005 | 10 218 |
| Moisture, ASTM D-3173 | Wt % | 2.09 | — |
| Ash, ASTM D-3174 | Wt % | 0.82 | 0.84 |

In addition to having a higher calorific value, coffee grounds have a higher volatile/fixed carbon ratio than that of wood-based particulate. Essentially, the result is "more flame per BTU". This is an excellent characteristic with respect to synthetic fire-log applications. Not only is the product smaller with equivalent calorific values, but also the flame duration is longer.

Several production efficiencies are also attainable from this invention. Since coffee can be obtained in a relatively homogenous mixture from food processing establishments, it is less likely to contain impurities such as one would find in sawdust (e.g. dirt from bark, furniture finishing processes, sawmills). The bulk handling characteristics are further simplified due to the narrow particle size distribution (PSD).

Irregularities in particle sizes in formed solid fuels may lead to cracking during combustion causing an undesirably vigorous and potentially hazardous burn rate. Used coffee has a highly uniform PSD, in contrast to wood products that contain highly irregular particle sizes. The result is a more homogeneous structure, and thus good shape retention and resistance to cracking during handling and combustion.

Other advantages arising from the uniform PSD of coffee grounds are noticed during raw material processing and when forming the final fuel mixture. Coffee grounds do not require any processing to decrease the PSD to acceptable limits. Sawdust mixtures tend to expand immediately following forming, and thus require cooling for shape retention. This is due to the spongy type texture inherent to sawdust. With coffee as the primary particulate, good shape retention results even at elevated temperatures.

This invention also offers various environmental advantages. Due to the absence of lignin, and the high volatile to fixed carbon ratio coffee is less aromatic than wood. Consequently, there is less chance of producing polycyclic aromatic hydrocarbons (PAHs) upon oxidation.

Additionally, wood products have many valuable alternative uses other than as a fuel such as producing paper, building materials, glue, value-added fuels like methanol, and other products which benefit from the structural characteristics of wood fibers. In contrast, the major portion of used coffee is currently a waste product that fills costly landfill space.

DESCRIPTION OF PREFERRED EMBODIMENTS

In one embodiment of the invention, the solid burnable fuel comprising at least 50% spent coffee grounds having a moisture content of less than 20%, and less than 30% of a combustible binder. The procedure for production of a solid fuel involves the initial drying of the spent coffee grounds to an optimal moisture content. Any required binders/additives are then mixed with the particulate, and the resultant mixture is formed into the desired shape under pressure. This solid fuel mixture is compressed to a density of between 650 and 1250 kg/m$^3$. Characteristics such as oxidation rate and flame duration can be controlled via surface area and density variations, and through addition of less volatile solid substances.

Many different binders may be employed with criteria as simple as combustibility. Petroleum and sugar-based binders have been used in processed solid fuels since the turn of the century, because of their desirable characteristics such as high calorific value. In order to reap the environmental benefits of burning coffee grounds, an environmentally sound binder should be used. Wax-type binders are the most desirable, as they have high energy content, are solid at room temperature, and have less complex products of combustion than most combustible byproducts.

In a further embodiment of the invention, a burnable fuel log comprises a homogeneous mixture including: between 50 and 85% coffee grounds having a particle size of less than 2 mm, a moisture content of less than 20%, and less than 30% wax as a binder. The extruded log has a density of between 800 and 950 kg/m$^3$. The density and surface area are varied to control oxidation rate, and to prevent cracking upon combustion. When the density limits are reached, other solid byproducts that are less volatile are then added for further combustion control. Any cellulosic material with a lower volatile to fixed carbon ration can be used (ie. Sawdust), although benefits of coffee will not be realized if greater than 25% of additives are used.

Several types of waxes meet the required criteria including insect, animal, vegetable, and mineral. However, the cost varies considerably depending on the source, and thus paraffin and microcrystalline waxes are typically the most cost effective. Paraffin is the preferred as it typically has less oil content, and thus has a cleaner burn. As paraffin is generally more expensive than microcrystalline, the difference in net cost per log is negligible as less wax is required for the present invention. The preferred property ranges for waxed-based binders are listed in table 2.

TABLE 2

Acceptable Ranges of Wax Binders

| Property | Test Method | Units | Min | Max |
|---|---|---|---|---|
| Melting Point | ASTM D-127 | °C. | 45 | 71 |
| Kinematic Viscosity | ASTM D-445 | cSt @ 100° C. | 2.5 | 19 |
| Oil Content | ASTM D-721 | % weight | 6 | 23 |

These two embodiments would involve using primarily coffee to form either artificial fuel logs or fire kindling blocks. Additional materials may be added in minor amounts, such as material to provide scent, including roasted coffee, and or material to vary flame colors, such as metal salts, etc.

In still a further embodiment of the invention, the solid burnable fuel comprises a cylindrically-shaped pellet composed of 100% spent coffee grounds, having a moisture content of less than 20%, compressed to a density of no less than 1000 kg/m$^3$, and a diameter of no more than ¾ of an inch. Coffee grounds are a preferred substance for generating pellets, because of the high calorific value and cleaner burn. No additives are required, as the natural constituents in coffee under high pressure assist in binding and sealing the pellets against moisture. As mentioned above, the narrow PSD and small average particle size of coffee, reduces the need for further processing. By contrast, sawdust in its raw state is normally passed through a hammer mill to achieve an acceptable PSD. The resultant pellet from the present invention has a higher calorific value than wood-based pellets. Each variable and its acceptable limits for solid coffee based fuels in log or pellet format are listed in table 3.

TABLE 3

Composition Variables and Ranges of Fuel

| Component | Units | Min | Max | Optimal (Log) | Optimal (Pellet) |
|---|---|---|---|---|---|
| Coffee Grounds | % weight | 50 | 100 | 75 | 100 |
| Moisture Content of Coffee | % weight | 0 | 20 | 15 | 15 |
| Combustible Binder | % weight | 0 | 30 | 25 | 0 |
| Other Cellulosic Particulate | % weight | 0 | 25 | 0 | 0 |
| Overall Mixture Density | Kg/m$^3$ | 650 | 1500 | 825 | 1100 |

The present invention entails the constituents required to produce a premium solid fuel, and optimal combinations thereof. However, one skilled in the art may modify these optimal configurations, within the specified ranges, in order to customize its applications.

What is claimed is:

1. A processed solid burnable fuel composition comprising greater than 70% dried spent coffee grounds and further including up to 25% of a solid combustible binder.

2. A processed solid burnable fuel composition as defined in claim 1, wherein the coffee grounds have a moisture content of less than 20%.

3. A processed solid burnable fuel composition as defined in claim 2, wherein the fuel is compressed to a density of between 650 kg/m$^3$ and 1500 kg/m$^3$.

4. A processed solid burnable fuel composition as defined in claim 3, wherein the solid combustible binder comprises wax.

5. A processed solid burnable fuel composition as defined in claim 4, wherein the wax is paraffin.

6. A processed solid burnable fuel composition as defined in claim 3, consisting of a pellet composed substantially entirely of spent coffee grounds at a density of at least 1000 kg/m$^3$.

7. A processed solid burnable fuel composition comprising a log comprising 50–80% coffee at a moisture content of less than 20%. and a solid combustible binder less than or equal to 25%.

8. A processed solid burnable fuel composition as defined in claim 7, wherein the solid combustible binder comprises wax.

9. A processed solid burnable fuel composition as defined in claim 8, wherein the wax is paraffin.

10. A processed solid burnable fuel composition as defined in claim 9, wherein the fuel comprises a log having a density of 650–950 kg/m$^3$.

11. A processed burnable fuel log comprising an extruded homogeneous mixture including: at least 75% coffee grounds having a particle size less than 2 mm and a moisture content of less than 20%; and up to 25% of a solid combustible binder, whereby the log has a density between 800 and 850 kg/m$^3$.

* * * * *